United States Patent

[11] 3,578,284

[72] Inventor Leo A. Martini
  Garland, Tex.
[21] Appl. No. 811,303
[22] Filed Mar. 28, 1969
[45] Patented May 11, 1971
[73] Assignee Telsco Industries
  Garland, Tex.

[54] SOLENOID VALVE
  5 Claims, 8 Drawing Figs.
[52] U.S. Cl. .................................................. 251/88,
  251/30, 251/129
[51] Int. Cl. .................................................. F16k 31/06
[50] Field of Search ........................................ 251/129,
  139, 88, 30

[56] References Cited
  UNITED STATES PATENTS
1,182,166  5/1916  Graham ........................ 251/88
1,342,641  6/1920  Moreton ....................... 251/139
2,157,480  5/1939  Cole ............................ 251/139
3,107,893  10/1963 Bashe ........................... 251/129X
3,471,119  10/1969 Risk ............................. 251/129X
  FOREIGN PATENTS
688,114  5/1930  France ........................ 251/139

Primary Examiner—Arnold Rosenthal
Attorney—Schley & Schley

ABSTRACT: A solenoid valve useable as a pilot for actuating a flow control valve of the pressure responsive type, the solenoid valve having a coacting valve ball and seat and means upstream of and reciprocable axially of the valve seat for actuating the valve ball which includes a portion for holding said valve ball engaged with the valve seat, a portion spaced from the seated ball for unseating said ball and a valve cage portion in spaced surrounding relation to said valve ball. The valve ball actuating means has at least a portion of magnetic material adapted to function as an armature for a solenoid so as to be attracted thereby for unseating the valve ball, the solenoid including an electromagnetic coil having multifilar windings of fine gauge wire of the order of 0.004 of an inch whereby the coil is of reduced volume and increased efficiency and said solenoid is relatively minute.

Patented May 11, 1971

INVENTOR.
Leo A. Martini
BY Shley & Shley
ATTORNEYS

Patented May 11, 1971 3,578,284
2 Sheets-Sheet 2
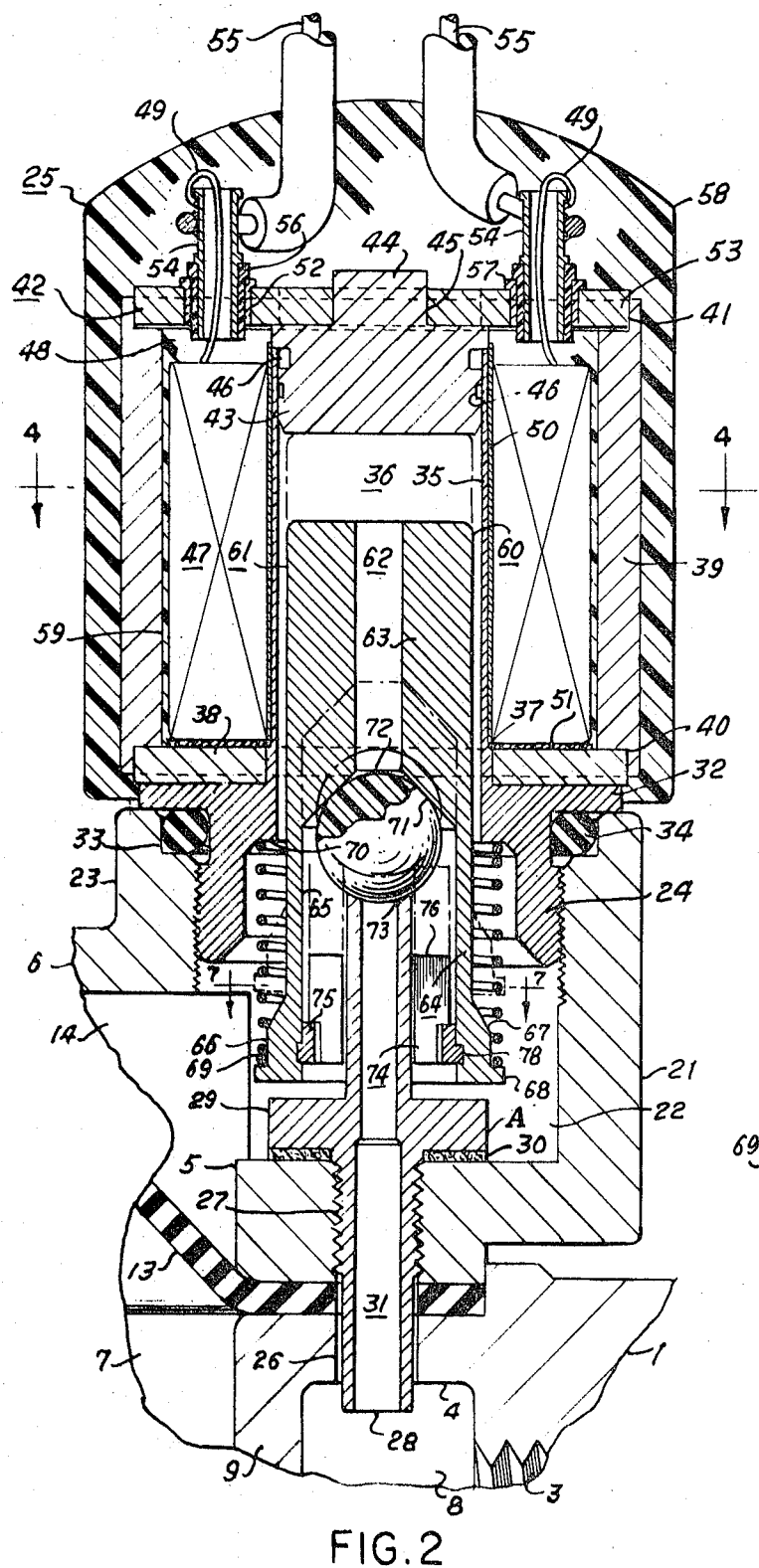
FIG. 2
FIG. 5
FIG. 6
FIG. 7
INVENTOR.
Leo A. Martini
BY 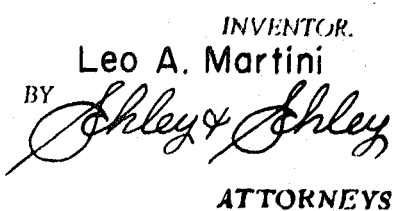
ATTORNEYS

SOLENOID VALVE

SUMMARY OF THE INVENTION

A novel solenoid valve adapted for use as a pilot valve for a flow control valve of the pressure responsive type, such as a normally closed diaphragm valve, but capable of being employed as a primary flow control valve. The solenoid valve includes an orifice fitting in the form of a nipple having an annular valve seat at its outer end, a valve ball of much larger diameter than the valve seat for coating therewith, reciprocable plunger means functioning as an armature for an electromagnetic coil for holding the valve ball in engagement with said valve seat and having means for guiding said valve ball between its seated and unseated positions, and spring means for maintaining the plunger means in engagement with said valve ball. The plunger means has valve cage forming means in surrounding spaced relation to the orifice fitting and valve ball and carries means for unseating said valve ball upon outward reciprocation of said plunger means, the valve ball unseating means being spaced from the seated valve ball whereby said plunger means moves out of engagement with seated ball valve prior to unseating thereof and is spaced therefrom in its unseated position. The electromagnetic coil of the solenoid surrounds a portion of the plunger means, at least a part of which is of magnetic material, and is comprised of a multiplicity of multifilar windings of fine gauge wire of the order of 0.004 of an inch whereby said coil is of reduced volume without sacrificing efficiency and with the result that said solenoid is relatively minute.

A construction designed to carry out the invention will be described hereinafter, together with other features of the invention.

BRIEF DESCRIPTION OF THE DRAWINGS

FIG. 2 is an enlarged, longitudinal, sectional view of the solenoid valve in closed position, the open position of said valve being shown in broken lines, FIG. 5 is a perspective view, in actual size and partly broken away, of a sleeve which surrounds the coil of the solenoid, FIG. 6 is an enlarged, perspective view of an actuating element for unseating the solenoid valve, FIG. 7 is a cross-sectional view taken on the line 7-7 of FIG. 2.

DESCRIPTION OF THE PREFERRED EMBODIMENT

Figure 1:
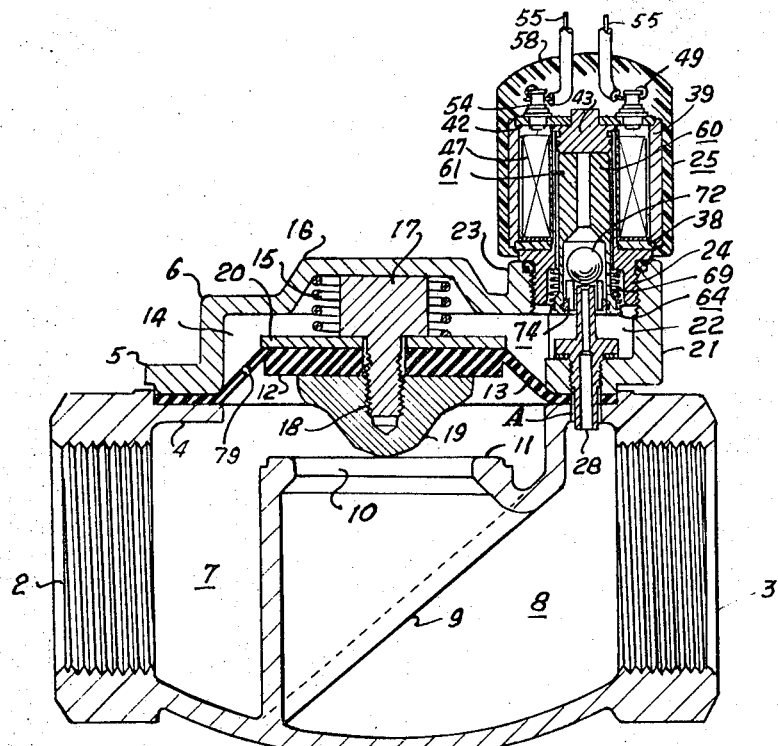
FIG. 1 is a longitudinal, sectional view showing a normally-closed, solenoid valve, constructed in accordance with invention, mounted on a diaphragm-type valve for pilot-actuation thereof, both valves being shown in actual size and in open position.

In FIG. 1 of the drawings, the numeral 1 designates the hollow body or housing of a globe valve of the diaphragm, pilot-operated, normally closed type having an open upper end and opposed, lateral inlet and outlet openings 2 and 3. It is noted that this valve may be of any type so long as it is operated by a normally closed pilot valve and that the upright position thereof is immaterial. An annular, horizontal, internal flange 4 surrounds the open upper end of the valve body 1 for engagement by a complementary flange 5 formed on the lower margin of an overlying, relatively shallow bonnet or cover 6, the flanges being detachably connected by suitable means (not shown). The interior of the valve body is divided into inlet and outlet chambers 7 and 8 by a diagonal partition 9 extending between the bottom of said body adjacent the inlet opening 2 and the top flange 4 of said body adjacent the outlet opening 3 and having an upstanding, circular flow orifice 10 medially of said openings. An annular, horizontal, upwardly facing valve seat 11 surrounds the flow orifice 9 and is adapted to be engaged by the coaxial circular portion 12 of a circular, flexible diaphragm 13, which has its margin clamped between the flanges 4 and 5, for closing said orifice to prevent flow from the inlet chamber 7 to the outlet chamber 8. As shown, the coaxial portion 12 may be of much greater thickness and consequent rigidity than the remainder of the diaphragm 13.

In addition to controlling flow through the orifice 10, the diaphragm closes the upper end of the inlet chamber and coacts with the bonnet 6 to form a pressure chamber 14 above said inlet chamber. For constantly urging the diaphragm 13 into engagement with the annular seat 11 of the flow orifice, a helical spring 15 is confined within the pressure chamber 14 in overlying relation to the coaxial portion 12 of said diaphragm by an upset center portion or boss 16 of the bonnet. The spring 15 may be centered by the enlarged head 17 of a screw-threaded pin 18, which depends coaxially through the diaphragm for connection with a flow control element 19, and a reinforcing disc 10 may be confined on the pin in overlying relation to the coaxial diaphragm portion. As has been pointed out, the structure of the valve forms is no part of the present invention and is for illustration purposes only.

Figure 3:
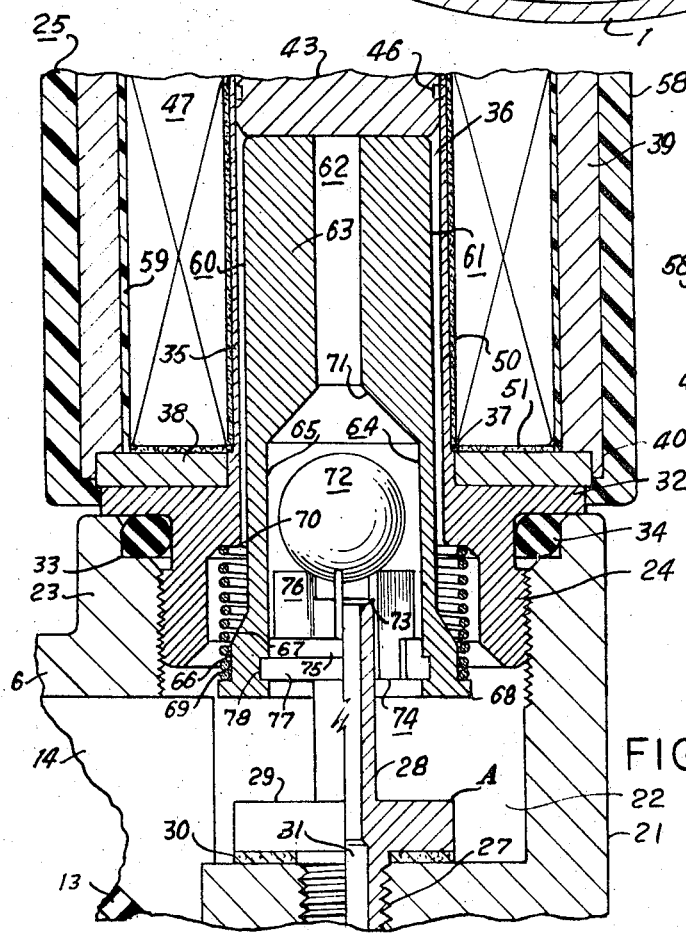
FIG. 3 is an enlarged, fragmentary, sectional view of the solenoid valve in open position.

A substantially annular boss 21 upstands from the bonnet 6 and its flange 5 adjacent the outlet opening 3 of the valve body 1 (FIGS. 1-3) and has its bore 22 opening laterally into the pressure chamber so as to form a reduced extension thereof. The upper end of the boss 21 is provided with an internally screw-threaded, annular collar 23 for supporting connection with an annular adapter 24, of nonmagnetic material, which is carried by the lower end of a solenoid 25. For establishing communication between the outlet chamber 8 and bore 22, aligned, upright openings 26 and 27 (FIG. 2 and 3) extend through the flanges 4 and 5 of the valve body and bonnet, respectively, and a flanged orifice fitting 28 is screw threaded in the openings 27 so as to project downwardly through the opening 26 and, preferably, depend a slight distance into said chamber. The orifice fitting 28 forms a part of a normally-closed, solenoid valve A and may be in the form of an elongate nipple having an annular, relatively large and thick flange 29 intermediate or medially of its ends and resting on the bonnet flange, with a sealing gasket 30 being confined between the flanges, whereby the upper portion of said fitting projects into the bore of the adapter 24. If desired, the lower portion of the bore of the orifice fitting may be enlarged to provide a counterbore 31.

Figure 8:
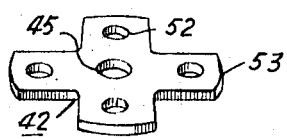
FIG. 8 is a slightly enlarged perspective view of a header for mounting the terminals of the solenoid.

An external, annular flange 32 is formed on the adapter 24 for overlying engagement with the collar 23 which has an internal, annular recess 33 in its upper end for receiving a packing, such as an O-ring 34, to seal off between said adapted and collar. Above the flange 32, a nonmagnetic, tubular core or sleeve 35 is mounted to provide a cylindrical armature chamber 36 which is aligned and communicates with the bore 22 of the bonnet boss 21. The nonmagnetic core 35 may be made integral with the adapter as shown and has an extremely thin wall which is of increased thickness adjacent its lower end to provide an upset, annular shoulder 37. An annular plate or washer 38, of magnetic material, rests on the adapter flange in surrounding relation to the thickened lower end portion of the nonmagnetic core and may be of slightly greater external diameter than said flange. The external margin of the plate 38 supports a relatively thick, cylindrical case or sleeve 39, of magnetic material, which has internal, annular recesses 40 and 41 (FIG. 5) at its respective lower and upper ends for receiving said plate as well as the outer extremities of the arms of an overlying cruciform header or spider 42 (FIG. 8). The upper end of the core 35 terminates short of the upper recess of the sleeve and has a flanged, complementary stop member or plug 43, of magnetic material and forming an armature pole, engaged therein so as to depend into the armature chamber 36. A coaxial, cylindrical boss 44 upstands from the plug 43 for engagement within a complementary opening 45 in the center of the header 42 whereby said plug is suspended from said header. In addition, the plug may have one or more circumferential grooves 46 to facilitate bonding of said plug to the core by a suitable adhesive (not shown) which also seals off therebetween.

An annular electromagnetic or solenoid coil 47, of multifilar structure, is disposed within an annular chamber 48 (FIGS. 2 and 3) formed by the coaction of the nonmagnetic core 35, magnetic plate 38 and magnetic sleeve 39 and is formed by a multiplicity of multifilar windings of relatively fine gauge wire of the order of 0.004 of an inch on said core, which wire is not illustrated except for its terminal ends 49. Before such windings, the core is wrapped or otherwise covered with dielectric material as shown at 50 and an annular, dielectric plate or washer 51 is placed over the magnetic plate within the chamber 48 to insulate the coil 47 from said core and plate as well as protect the inner and bottom windings of said coil. It is noted that the coil is of less volume than its chamber whereby said coil is spaced from the sleeve 39 and header 42. An opening 52 is formed in each arm 53 of the magnetic header and each of the openings of opposed arms is adapted to have one of the terminal wire ends 49 extending upwardly therethrough for connection with the upper portion of a surrounding terminal tube or tubular post 54 which projects through said opening above said header and has an insulated electrical lead 55 connected thereto. Each tubular terminal post 54 is insulated from the header 42 by a flanged bushing or nipple 56, of dielectric material, which may be supported in the opening 52 by a flanged collet 57.

Figure 4:
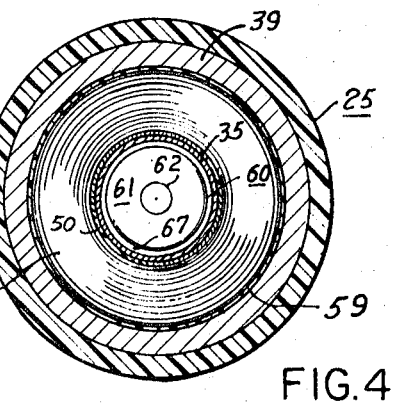
FIG. 4 is a cross-sectional view taken on the line 4-4 of FIG. 2 and on a slightly smaller scale.

A casing or housing 58, of suitable plastic or other dielectric material, is molded around all of the hereinbefore described parts of the solenoid 25 and the end portions of the electrical leads 55 so as to completely impregnate and enclose said solenoid as well as overlie the upper portion of the adapter flange 32. As shown at 59 in FIGS. 2—4, the dielectric material of the casing 58 fills the voids of the coil chamber so as to insulate and seal off the coil 47 from the surrounding sleeve and overlying header of the solenoid. Although omitted for clarity of illustration, it is readily apparent that the casing material flows into and fills the tubular terminal posts 54 as well as the areas around said posts and the header 42. Due to the adhesive bonding of the plug 43 within the core 35, the material of the casing is prevented from entering the armature chamber 36; however, said material ensures fluidtight sealing of the upper end portion of said chamber. Also, the casing 58 serves to connect all of the aforesaid solenoid parts together in an assembly which is secured to the adapter 24 for mounting as a unit on the valve bonnet 6 by screw threading said adapter into the collar 23 of said bonnet.

The solenoid coil is adapted to be energized by either direct or alternating current, and the latter may be rectified so as to increase the power produced by said coil by mounting rectifiers (not shown) in the pair of header openings 52 which are not employed for mounting the terminal posts. Otherwise, these openings are filled with the casing material or may be omitted. Manifestly, the annular plate 38, sleeve 39 and header 42 coact to provide a flux path from the coil 47 to the armature pole formed by the plug 43.

An armature is reciprocable in the chamber 36 and includes an elongate, cylindrical member or plunger 60 of magnetic material and of less diameter than said chamber so as to be spaced from the solenoid core 35. The plunger 60 has a relatively massive upper portion or body 61 which functions as the armature and which may be formed by a coaxial bore 62 of relatively small diameter so as to provide an annular wall 63 of a thickness greater than the diameter of the bore. A sleeve or skirt 64 depends from the armature body 61 through the bore of the adapter 24, in spaced surrounding relation to the upper portion of the fitting 28, and may be formed by greatly enlarging the lower portion of the bore 62 to provide a counterbore or cylindrical valve chamber or cage 65. It is obvious that the skirt 64 need not be continuous circumferentially and may be interrupted so as to be in the form of upright legs. The lower extremity of the skirt, which forms a part of the solenoid valve A, is enlarged externally to provide a thickened wall portion 66 having an upset, beveled shoulder 67 at its upper end and an external, radial flange 68 at its lower end which is spaced above or outwardly of the flange 29 of the orifice fitting. For urging the armature plunger downwardly, a helical spring 69 is confined on the skirt between its flange 68 and a downwardly facing shoulder 70 which is formed by counterboring or enlarging the lower portion of the bore of the adapter 24.

A frustoconical shoulder 71 is provided at the lower end of the armature body so as to form an annular, beveled face at the inner or upper end of the chamber 65 in overlying, spaced relation to the fitting 28 for centering a valve ball 72, of plastic or other suitable dielectric material, relative to an annular, complementary seat 73, of much smaller diameter, at the upper end of said fitting. The valve ball 72 is of smaller diameter than its chamber and is adapted to be lifted from the seat 73 by a split, substantially circular actuating element or spider 74 (FIGS. 1—3) upon upward or inward movement of the armature plunger 60 relative to the solenoid 25. As shown most clearly in FIGS. 6 and 7, the actuating element 74 has a substantially annular base or lower end 75 from which a plurality, preferably a trio, of equally-spaced, upright arms or vanes 76 upstand for engaging the valve ball. A coextensive, external flange 77 is formed on the lower margin of the base 75 for engagement in a complementary, annular groove 78 (FIGS. 2 and 3) provided within the lower or outer end of the valve chamber at the thickened wall portion 66 of the skirt 64 to connect the actuating element to the armature plunger. Due to its substantially annular configuration, the actuating element 74 may be contracted to permit snapping of the base flange 77 into the skirt groove 78. The upright arms 76 are spaced from the seated valve ball and are of greater radial width than the base of the element so as to project inwardly thereof into relatively close proximity to the upper portion of the orifice fitting whereby said arms coact with said fitting portion in guiding the reciprocation of the armature plunger 60 without unduly restricting flow. In addition to holding the armature plunger in its lower position, the spring 69 maintains the face 71 of the armature body 61 in engagement with the valve ball 72 so as to hold the latter against the seat of the fitting 28.

OPERATION

In operation, water or other fluid enters the inlet opening 2 and flows into the pressure chamber 14 (FIG. 1) through an aperture 79 in the diaphragm 13 whereby the pressure of the fluid coacts with the force of the spring 15 to hold the coaxial portion 12 of said diaphragm in engagement with the valve seat 11 to prevent flow through the orifice 10 into the outlet chamber 8. The fluid is prevented from escaping from the pressure chamber by the engagement of the valve ball 72 with the valve seat 73 of the orifice fitting 28, due to the solenoid 25 being deenergized, and enters the bore 22 of the collar 21 as well as the bore of the adapter 24, armature chamber 36, armature body bore 62 and valve chamber 65 of the solenoid valve A. Upon energization of the solenoid, the magnetic flux induced by the coil 47 flows through the annular plate 38, sleeve 39 and header 42 to the plug 43 so as to attract and lift the armature plunger 60 by overcoming the force of the spring 69. Since the actuating element 74 is connected to and moves upwardly with the plunger, the valve ball is lifted from its seat by the guide arms 76 to permit the exhaust of fluid from the pressure chamber through the bore of the orifice fitting to the outlet chamber. It is noted that the face 71 of the armature body 61 rises out engagement with the valve ball 72 prior to the engaging of said ball by the guide arms, whereby the fluid can glow freely therearound as well as from the upper portion of the armature chamber through the bore of said body, and that said arms support the unseated ball or prevents it from engaging the valve seat. Due to the fitting bore being of greater diameter than the diaphragm aperture 79, which constantly admits fluid to the chamber 14, the pressure within said chamber is reduced or relieved sufficiently by the escape of fluid through said fitting bore to permit upward flexing of the diaphragm by the pressure of the fluid within the inlet chamber being exerted against the underside of said diaphragm and overcoming the force of its overlying spring. The upward flexing of the diaphragm 13 disengages its coaxial portion 12 from the valve seat to allow flow from the inlet chamber 7 to the outer chamber 8 through the flow orifice of the valve.

Since the entire underside of the unseated diaphragm is exposed to the pressure of the fluid flowing through the valve, said diaphragm is held in fully opened position until sufficient pressure is restored in the pressure chamber. Upon deenergization of the solenoid 25, the armature plunger 60 is urged downwardly by the force of the spring 69 whereby the beveled face 71 of the plunger body 61 directs the valve ball 72 into reengagement with the valve seat 73 of the orifice fitting 28 to prevent flow through the bore of said fitting and thereby trap the fluid admitted to the chamber 14 by the diaphragm orifice 79. The diaphragm portion 12 reseats as soon as the pressure within the pressure chamber substantially equals or approaches the pressure in the inlet chamber since the force of the compressed spring 15 bears against the topside of said diaphragm portion. Due to this spring force and the greater pressurized area of the topside of the seated diaphragm 13, upward flexing and unseating of said diaphragm is prevented until the pressure within the chamber 14 is reduced or relieved sufficiently.

RESUME

Obviously, the source of the pressure fluid for actuating the valve 1 is not critical and may be other than the fluid controlled by said valve. As an example, the valve may be employed to control the flow of water, oil or other liquid and an entirely different type of fluid, such as air or gas under pressure, may be admitted to and exhausted from the pressure chamber from and to an exterior source for coacting with the spring 15 in closing said valve and resisting the opening thereof. It is only essential to control the rates of entry and exhaust of the actuating fluid to and from the chamber 14 which requires that the diaphragm aperture 79 or other inlet be of restricted size and of substantially equal or less area than the bore of the orifice fitting 28 or other outlet of said chamber. Of course, the inlet and outlet of the pressure chamber do not communicate with the interior of the valve body 1 when an exterior actuating fluid is utilized, and the effective pressure of the exterior actuating fluid within the pressure chamber must be sufficient to hold the valve closed in coaction with the force of the spring 15. It is pointed out, however, that the materials of the pilot valve and solenoid as well as the mechanical seal between the parts thereof is such that the fluid controlled by the valve may be used readily as the actuating fluid therefor.

As is well known, the use of direct current for energizing the solenoid coil 47 is more advantageous than alternating current due to its nonsurging characteristics, elimination of solenoid core losses and coil heating by eddy currents and hysteresis, thereby producing greater input to output power. Since alternating current fluctuates, the corresponding produced force fluctuates and causes unsteady armature attractions, particularly when the armature is spring biased. In addition, multifilar windings of relatively small gauge wire provide greater coil density for the same ampere turn factor. The molded casing 58 protects the solenoid 25 from damage by moisture, corrosion and mechanical means as well as serves to "unitize" said solenoid whereby the valve 1 may be buried or placed underground. Also, the structure of the solenoid provides an unusually effective balanced configuration with a very favorable power into power out ratio regardless of whether AC or DC operated, thereby effecting an obvious economy which is of extreme importance when the valve is relatively remote from the electrical energy source such as on golf courses, parks and other large land areas. The relative minuteness of the solenoid is of readily apparent economical importance.

From the foregoing, it is readily apparent that the solenoid valve A is of novel construction and functions in any position since it is self-closing and is held closed by the force of the spring 69. Although this valve is particularly adapted for use as a pilot valve to operate a fluid actuated or pressure-responsive valve, manifestly, it may be utilized wherever a solenoid valve is required and may be employed to directly control the flow of a fluid. Also, the solenoid valve is corrosion-resistant as well as fluidtight. The valve ball 72 is freely movable when unseated, being positively guided into engagement with its seat 73 by the beveled face 71 of the armature body 61 and remaining seated until dislodged by the guide arms 76 upon upward movement of the actuating element 74 with the armature plunger 60. Since the actuating element supports the unseated valve ball or holds said ball out of engagement with the valve seat, it is unnecessary for the fluid to perform this function whereby said valve ball tends to remain stationary and is not subject to spinning movement. It is noted that the initial upward travel of the actuating element 74 relative to the seated valve ball 72 permits acceleration of the rate of said travel prior to engagement of said element with said ball so as to create energy for lifting thereof in coaction with the magnetic force of the energized solenoid 25. As a result, the solenoid may be of relatively less strength or the passage of the solenoid valve may be of relatively larger area than when the actuating element unseats the valve ball upon initial upward movement.

The foregoing description of the invention is explanatory thereof and various changes in the size, shape and materials, as well as in the details of the illustrated construction may be made without departing from the spirit of the invention.

I claim:
1. A solenoid valve including:
   means forming a housing having an inlet and outlet,
   means forming an orifice establishing communication between the inlet and outlet and having a valve seat facing upstream and surrounding the orifice,
   a globular valve member engageable with the valve seat,
   means for actuating the valve member including a plunger upstream of and reciprocable axially of said orifice and engageable with said valve member for holding said member in engagement with said valve seat,
   means for biasing said plunger in a downstream direction relative to said valve seat,
   means extending from said plunger in spaced relationship to said valve member to provide a cage therefor,
   a nipple extending into and spaced from the cage means and carrying said valve seat,
   said plunger having at least a portion of magnetic material so as to function as a solenoid armature,
   and a solenoid for attracting said plunger to permit unseating of said valve member.
2. A solenoid valve as defined in claim 1 wherein:
   the biasing means is in the form of a helical spring surrounding the cage means of the valve member actuating means.
3. A solenoid valve as defined in claim 1 wherein the means for actuating the globular valve member includes:
   means movable with the plunger of the valve member actuating means for unseating said valve member upon upstream movement of said plunger relative to the orifice,
   the means for unseating said valve member being spaced therefrom in its seated position to permit movement of said plunger away from said valve member prior to unseating thereof.
4. A solenoid valve as defined in claim 3 wherein:
   the biasing means is in the form of a helical spring surrounding the cage means of the valve member actuating means.
5. A solenoid valve including:
   means forming a housing having an inlet and outlet,
   means forming an orifice establishing communication between the inlet and outlet and having a valve seat facing upstream and surrounding the orifice,
   a globular valve member engageable with the valve seat, means for actuating the valve member including a plunger upstream and reciprocable axially of said orifice and engageable with said valve member for holding said member in engagement with said valve seat,
means for biasing said plunger in a downstream direction relative to said valve seat,
a nipple downstream of said plunger carrying said valve seat,
means surrounding the nipple and movable with said plunger for unseating said valve member upon relative upstream movement of said plunger,
said plunger having at least a portion of magnetic material so as to function as a solenoid armature,
and a solenoid for attracting said plunger to permit unseating of said valve member.